United States Patent
Lin et al.

(10) Patent No.: US 6,954,039 B2
(45) Date of Patent: Oct. 11, 2005

(54) DRIVING CIRCUIT FOR LIGHT EMITTING DIODES

(75) Inventors: Jyh-Chain Lin, Tu-chen (TW); Ching-Yen Lee, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 29 days.

(21) Appl. No.: 10/796,749

(22) Filed: Mar. 8, 2004

(65) Prior Publication Data

US 2004/0183478 A1 Sep. 23, 2004

(30) Foreign Application Priority Data

Mar. 7, 2003 (TW) ........................................ 92104987 A

(51) Int. Cl.⁷ .............................................. G05F 1/00
(52) U.S. Cl. ..................... 315/291; 315/224; 315/307; 323/234
(58) Field of Search ................................ 315/291, 224, 315/307, 185 R, 312; 323/234, 282, 271, 274; 345/82, 84

(56) References Cited

U.S. PATENT DOCUMENTS

| | | | |
|---|---|---|---|
| 4,160,934 A | 7/1979 | Kirsch | 315/307 |
| 5,025,204 A * | 6/1991 | Su | 323/274 |
| 5,175,748 A | 12/1992 | Takahashi | 375/316 |
| 6,097,360 A * | 8/2000 | Holloman | 345/84 |
| 6,690,146 B2 * | 2/2004 | Burgyan et al. | 323/271 |
| 6,734,639 B2 * | 5/2004 | Chang et al. | 315/291 |
| 2002/0047642 A1 * | 4/2002 | Miyagawa | 315/307 |
| 2003/0086457 A1 * | 5/2003 | Theodoras | 372/38.02 |

* cited by examiner

Primary Examiner—Wilson Lee
Assistant Examiner—Ephrem Alemu
(74) Attorney, Agent, or Firm—Wei Te Chung

(57) ABSTRACT

An LED driving circuit includes a current limiting resistor (24), an FET (22), and a feedback circuit (23). The FET has a drain electrode connected to the current limiting resistor to provide current to a load such as an LED (25), and the feedback circuit has a variable reference voltage source (234) for controlling a current of the drain electrode of the FET.

13 Claims, 2 Drawing Sheets

DRIVING CIRCUIT FOR LIGHT EMITTING DIODES

BACKGROUND OF THE INVENTION

1. Field of the Invention

The present invention relates to an electronic driving apparatus, and particularly to a driving circuit for light emitting diodes (LEDs).

2. Description of Prior Art

Referring to FIG. 2, in a conventional LED driving circuit, a current limiting resistor 11 is provided between a power supply 10 and an LED array 12 formed by an m×n matrix of light emitting diodes (LEDs) 121. A voltage provided by the power supply 10 is U, a resistance of the current limiting resistor 11 is R, a resistance of each LED 121 is $R_S$, and a current of a main path is I. The voltage-current ($V_F$-$I_F$) characteristic of each LED 121 is shown in FIG. 3, and can be expressed by the following equation:

$$V_F = V_{on} + R_S I_F + (\Delta V_F/\Delta T)(T - 25° C.)$$

where $V_{on}$ is a threshold voltage of the LED 121

When a temperature of the environment is constant, the above equation can be simplified as follows:

$$V_F = V_{on} + R_S I_F$$

Thus the electrical characteristic of the LED driving circuit can be expressed as:

$$U - mV_{on} = I(R + R_S(m/n))$$

Simplifying the above equation yields:

$$U - V_X = I(R + R_X)$$

where $$V_X = m*V_{on}, R_X = R_S(m/n)$$

Because of the existence of $V_{on}$, the current I does not change proportionally with the voltage U. For example, when the voltage U changes to 2U, the current I does not double but instead changes to less than 2I. The LED driving circuit cannot regulate the current I proportionally by linearly changing the voltage U provided to the LED array 12. Therefore it is difficult to precisely control the current I.

Similarly, when a quantity of the LEDs 121 or when a form of the LED array 12 is changed (i.e., $V_X$ and/or $R_X$ is varied), alterations of the voltage U and the resistor R are required in order to control the current I. However, for the reasons described above, such alterations to precisely control the current I are difficult.

Therefore, it is desirable to provide an improved driving circuit which overcomes the above-described disadvantages of the conventional driving circuit.

SUMMARY OF THE INVENTION

An object of the present invention is to provide a driving circuit that allows precise control of current.

In order to achieve the above-described object, a light emitting diode driving circuit in accordance with the present invention includes a current limiting resistor, an FET (Field Effect Transistor), and a feedback circuit. The FET has a drain electrode connected to the current limiting resistor to provide current to a load such as an LED, and the feedback circuit has a variable reference voltage source for controlling a current of the drain electrode of the FET.

Other objects, advantages, and novel features of the present invention will become more apparent from the following detailed description when taken in conjunction with the accompanying drawings.

DETAILED DESCRIPTION OF THE PRESENT INVENTION

Reference now will be made to the drawings to describe the present invention in detail.

Figure 1:
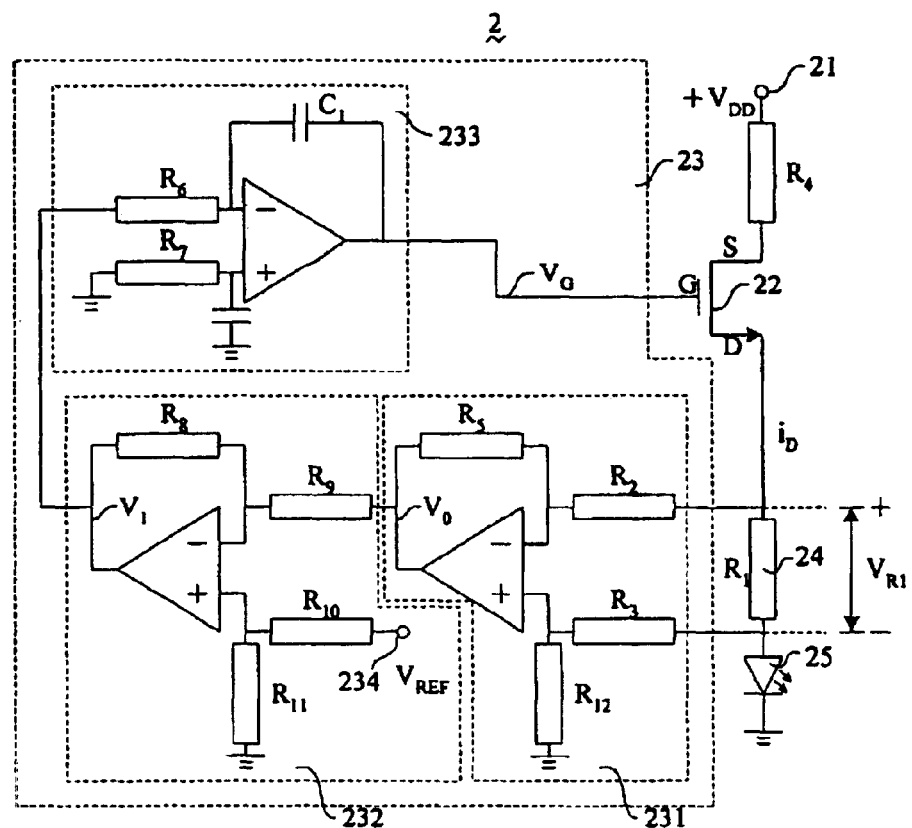
FIG. 1 is a schematic view of a driving circuit in accordance with the present invention.
Figure 2:
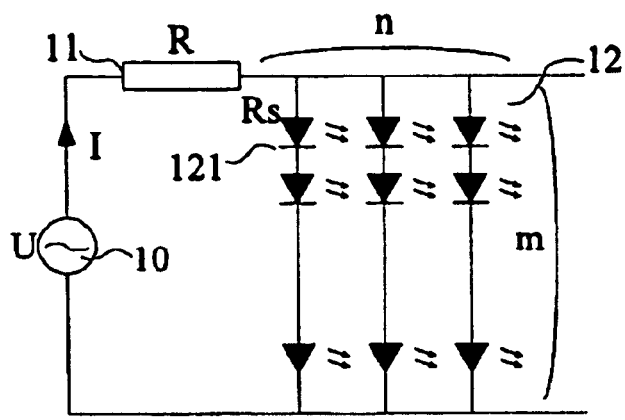
FIG. 2 is a schematic view of a conventional LED driving circuit.
Figure 3:
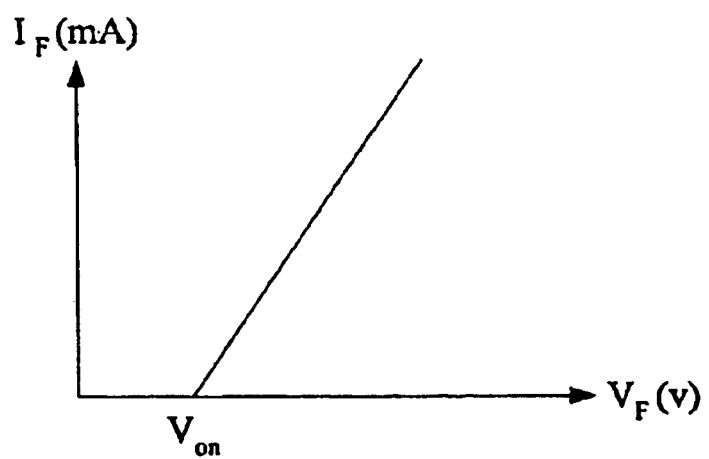
FIG. 3 is a graph showing the voltage-current characteristic of each of LEDs in the LED driving circuit of FIG. 2.

Referring to FIG. 1, a driving circuit 2 for an LED according to the present invention includes a power supply 21, an FET 22, a feedback circuit 23, a current limiting resistor 24, and an LED 25. The FET 22 has a source electrode S, a gate electrode G, and a drain electrode D. The source electrode S is connected to the power supply 21. The current limiting resistor 24 is provided between the drain electrode D of the FET 22 and the LED 25.

The feedback circuit 23 includes a first differential amplifier 231, a second differential amplifier 232, an integrating circuit 233, and a variable reference voltage source 234. The first differential amplifier 231 has two input terminals, which are connected to two terminals of the current limiting resistor 24, respectively. An output terminal of the amplifier 231 and the variable reference voltage source 234 are connected to two input terminals of the second differential amplifier 232. An output terminal of the second differential amplifier 232 is connected to the integrating circuit 233, and an output terminal of the integrating circuit 233 is connected to the gate electrode G of the FET 22.

A voltage provided by the power supply 21 is $V_{DD}$, a voltage drop of the current limiting resistor 24 is $V_{R1}$, an output voltage of the first differential amplifier 231 is $V_0$, an output voltage of the second differential amplifier 232 is $V_1$, a voltage provided by the variable reference voltage source 234 is $V_{REF}$, and an output voltage of the integrating circuit 233 is $V_G$. Thus $V_G$ is a voltage of the gate electrode G of the FET 22. An operating current of the drain electrode D of the FET 22 is $i_D$. That is, a current in the current limiting resistor 24 and the LED 25. A resistance of the current limiting resistor 24 is $R_1$, a resistance of a resistor (not labeled) between the power supply 21 and the source electrode S is $R_4$, and resistances of resistors (not labeled) of the feedback circuit 23 are $R_2$, $R_3$ and $R_5$~$R_{12}$ respectively. A capacitance of a capacitor (not labeled) of the integrating circuit 233 is $C_1$.

It would be desirable to use the feedback circuit 23 for stabilizing the operating current $i_D$ in the LED 25. In order to achieve this object, keeping $V_{R1}$ constant is all that is required.

The two input terminals of the first differential amplifier 231 are connected to the two terminals of the current limiting resistor 24 respectively; therefore $V_{R1}$ is an input signal of the first differential amplifier 231. When $R_{12}/R_3 = R_5/R_2$, $V_0$ is expressed as:

$$V_0 = -R_5 V_{R1}/R_2 \quad (1)$$

The output terminal of the amplifier 231 and the variable reference voltage source 234 are connected to the two input terminals of the second differential amplifier 232. When $R_{11}/R_{10} = R_8/R_9$, $V_1$ can be expressed by the following equation:

$$V_1 = -(R_8/R_9)(-R_5 V_{R1}/R_2 - V_{REF}) \quad (2)$$
$$= (R_8/R_9)(R_5 V_{R1}/R_2 + V_{REF})$$

The output voltage $V_1$ is input to the integrating circuit 233, and the output voltage of the integrating circuit 233 is $V_G$. That is, the voltage of the gate electrode G of the FET 22 becomes:

$$V_G = -(1/RC_1) \int V_1 dt \quad (3)$$
$$= -(1/RC_1) \int (R_8/R_9)(R_5 V_{R1}/R_2 + V_{REF}) dt$$

When the resistances of the resistors $R_2$, $R_3$ and $R_5 \sim R_{12}$ are equal, Eq. (3) can be simplified as follows:

$$V_G = -(1/RC_1) \int (V_{R1} + V_{REF}) dt \quad (4)$$

Because $V_G$ and $i_D$ have a linear relationship, this can be expressed as: $V_G = K i_D$, where K is a constant. Also, $V_{R1} = i_D R_1$. Substituting these two equations into Eq. (4) yields:

$$K i_D = -(1/RC_1) \int (i_D R_1 + V_{REF}) dt \quad (5)$$

Differentiating Eq. (5) gives:

$$K i'_D = -(1/RC_1)(i_D R_1 + V_{REF}) \quad (6)$$

Solving for $i'_D$ yields:

$$i'_D = -A i_D + B V_{REF} \quad (7)$$

where $$A = (1/RC_1) R_1 / K$$

and $$B = (1/RC_1)/K$$

Then the solution of the Eq. (7) is expressed as:

$$i_D = (B V_{REF}/A)(1 - \text{Exp}(-At)) \quad (8)$$

When time t increases, Exp(−At) approaches zero, and finally the following equation is obtained:

$$i_D = B V_{REF}/A = V_{REF}/R_1 \text{ or}$$

$$i_D R_1 = V_{REF} \quad (9)$$

Equation (9) expresses the linear relationship between the operation current in the LED 25 and the variable reference voltage source 234. Thus the operation current in the LED 25 can be precisely regulated by adjusting the variable reference voltage source 234.

In this embodiment, the resistances of the resistors $R_2$, $R_3$ and $R_5 \sim R_{12}$ in the feedback circuit are equal. If the resistances of said resistors are not equal, then equation (9) is modified to:

$$i_D R_1 K_R = V_{REF}$$

Where $K_R$ is a constant, which is determined by the resistances of said resistors. That is, $K_R$ does not affect the linear relationship between the variable reference voltage source 234 and the operation current of the LED 25.

An LED or an LED array driven by the driving circuit 2 of the present invention can be used as a light source in a field of display or a like apparatus.

The main advantage of the described embodiment over the prior art is that the driving circuit 2 includes a feedback circuit which stabilizes the operating current under different loads, and which provides precise current control.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light emitting diode driving circuit comprising:
   a current limiting resistor adapted to be connected to at least one light emitting diode;
   a field effect transistor (FET) comprising a source electrode, a gate electrode and a drain electrode, the drain electrode being connected to the current limiting resistor;
   a feedback circuit comprising a variable reference voltage source for controlling current of the drain electrode of the FET.

2. The driving circuit as claimed in claim 1, wherein the source electrode of the FET is connected to an input voltage supply.

3. The driving circuit as claimed in claim 1, wherein the feedback circuit further comprises a first differential amplifier, a second differential amplifier and an integrating circuit.

4. The driving circuit as claimed in claim 3, wherein the first differential amplifier comprises an output terminal and two input terminals.

5. The driving circuit as claimed in claim 4, wherein the second differential amplifier comprises an output terminal and two input terminals.

6. The driving circuit as claimed in claim 4, wherein the input terminals of the first differential amplifier are connected to two terminals of the current limiting resistor, respectively.

7. The driving circuit as claimed in claim 5, wherein the output terminal of the first differential amplifier and the variable reference voltage source are connected to the two input terminals of the second differential amplifier, respectively.

8. The driving circuit as claimed in claim 5, wherein the output terminal of the second differential amplifier is connected to the integrating circuit.

9. The driving circuit as claimed in claim 3, wherein the integrating circuit comprises an output terminal, which is connected to the gate electrode of the FET.

10. A light emitting source driving circuit comprising:
    a field effect transistor (FET) comprising a source electrode connected to a power supply, a gate electrode connected to a feedback circuit, and a drain electrode connected to a current limiting resistor to which a light source is connected sequentially; wherein
    the feedback circuit comprises a variable reference voltage source which is proportional to a current passing the resistor and entering the light source.

11. The circuit as claimed in claim 10, wherein said feedback circuit includes a first differential amplifier with two terminals of which one is connected between one end of the resistor and the drain electrode, and the other is connected between the other end of the resistor and the light source.

12. The circuit as claimed in claim 11, wherein said feedback circuit further includes a second differential amplifier connected to said first differential amplifier with said variable reference voltage source thereof.

13. The circuit as claimed in claim 12, wherein said feedback circuit further includes an integrating circuit connected between the second differential amplifier and said gate electrode.

* * * * *